US005609052A

United States Patent [19]

Denning

[11] Patent Number: 5,609,052

[45] Date of Patent: Mar. 11, 1997

[54] LOADER AND METHOD FOR LOADING LOCK PINS

[76] Inventor: Joel M. Denning, P.O. Box M, Pacific Grove, Calif. 93950

[21] Appl. No.: 342,160

[22] Filed: Nov. 18, 1994

[51] Int. Cl.[6] ................................ E05B 27/00; B23Q 3/00

[52] U.S. Cl. ................................ 70/368; 70/378; 70/431; 70/460; 70/493; 29/464

[58] Field of Search ..................... 70/493, 365, 366–368, 70/375, 377, 378, 384, 385, 394, 411, 431, 447, 460, 466, DIG. 1, 5, 15, 44; 81/15.9; 29/464, 200

[56] References Cited

U.S. PATENT DOCUMENTS

| | | | |
|---|---|---|---|
| 1,437,832 | 12/1922 | Bradley, Jr. | 29/464 |
| 1,679,759 | 8/1928 | Best | 29/200 |
| 3,111,748 | 11/1963 | Doll | 29/208 |
| 3,218,699 | 11/1965 | Maese | 29/464 X |
| 3,258,944 | 7/1966 | Kerr | 70/431 X |
| 3,258,945 | 7/1966 | Kerr | 70/431 X |
| 4,391,112 | 7/1983 | Neyret | 70/493 |
| 5,232,528 | 8/1993 | Reznickenko et al. | 70/460 X |
| 5,279,138 | 1/1994 | Gallagher | 70/366 |

*Primary Examiner*—Suzanne L. Dino
*Attorney, Agent, or Firm*—Timothy T. Tyson; Ted Masters

[57] ABSTRACT

A loader 30 and method of loading lock pins 104 and 112 into the plug portion 100 of a cylindrical lock. The loader 30 includes a body 32 and cover 34. The body 32 has a plurality of pin dispensing barrels 36 which are loaded with a preestablished plurality of lock pins 104 and 112. The body 32 fits under the plug portion 100 so that the pin dispensing barrels 36 abut and coaxially align with a corresponding plurality of pin cavities 102 in the plug portion 100, The combined body 32 and plug portion 100 are then turned upside down (rotated approximately 180') and gravity causes the lock pins 104 and 112 to vacate the pin dispensing barrels 36 and enter the pin cavities 102 in the plug portion 100.

5 Claims, 5 Drawing Sheets

FIG. 1
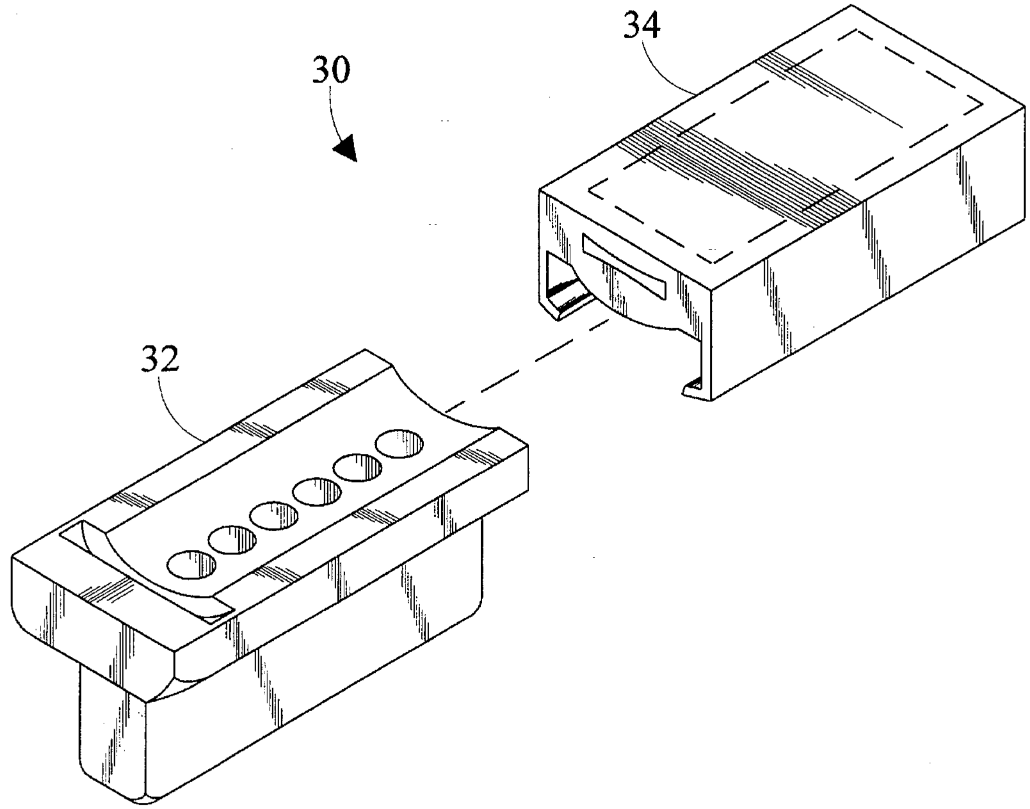
FIG. 2
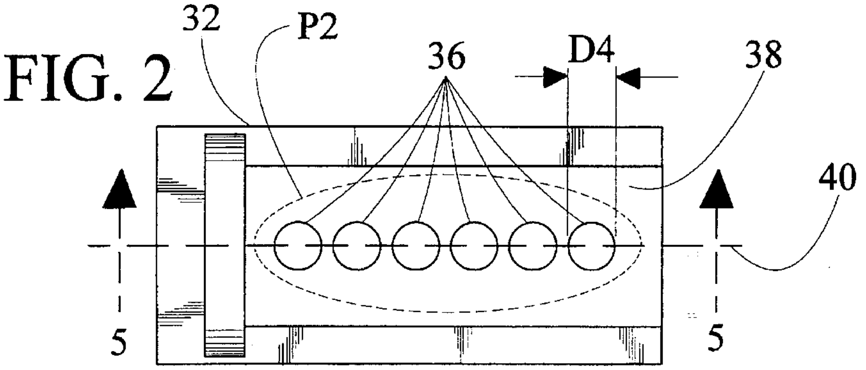
FIG. 3
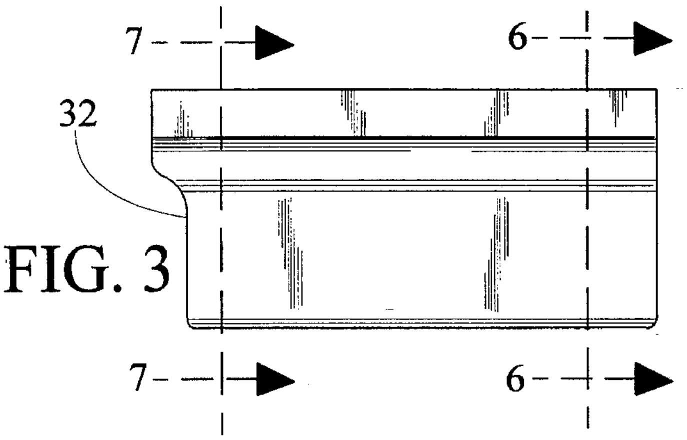
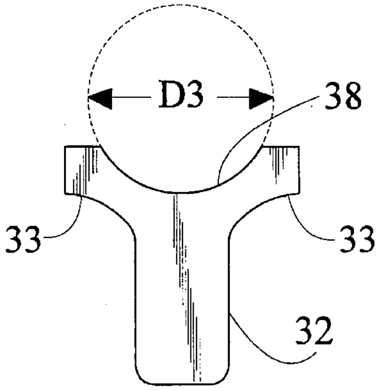
FIG. 4

FIG. 5
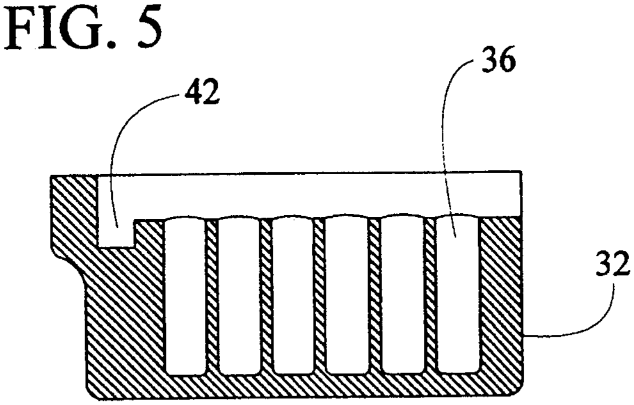
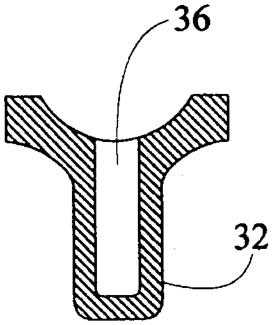
FIG. 6
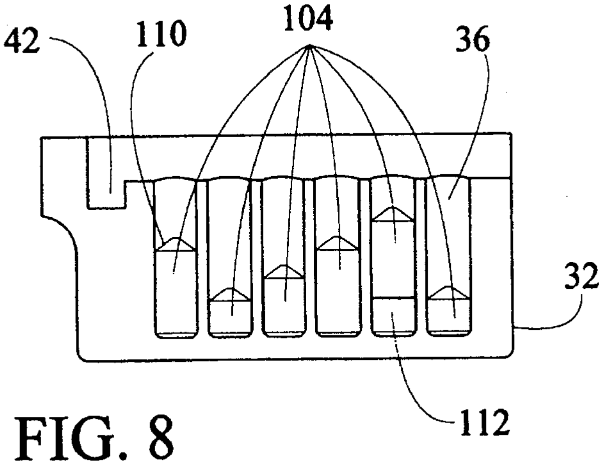
FIG. 8
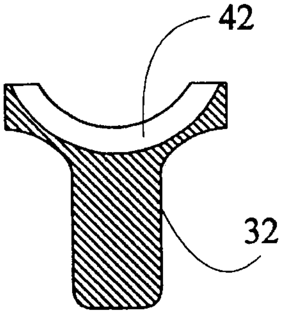
FIG. 7
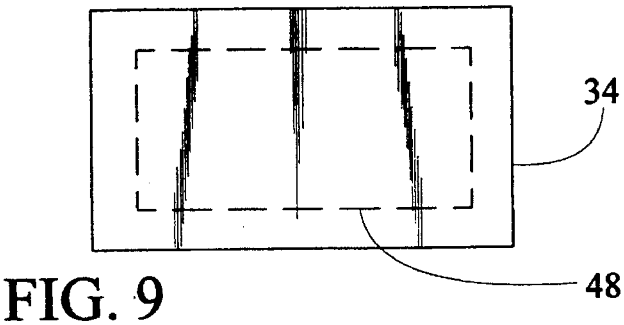
FIG. 9
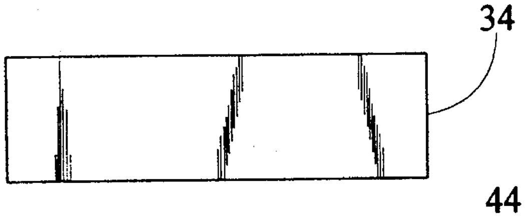
FIG. 10
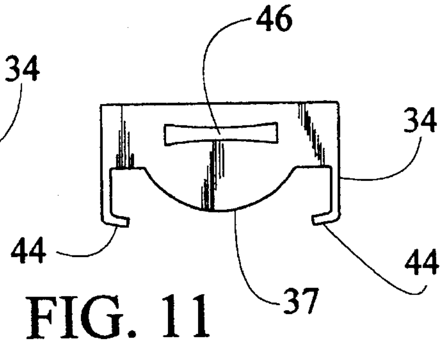
FIG. 11

FIG. 12
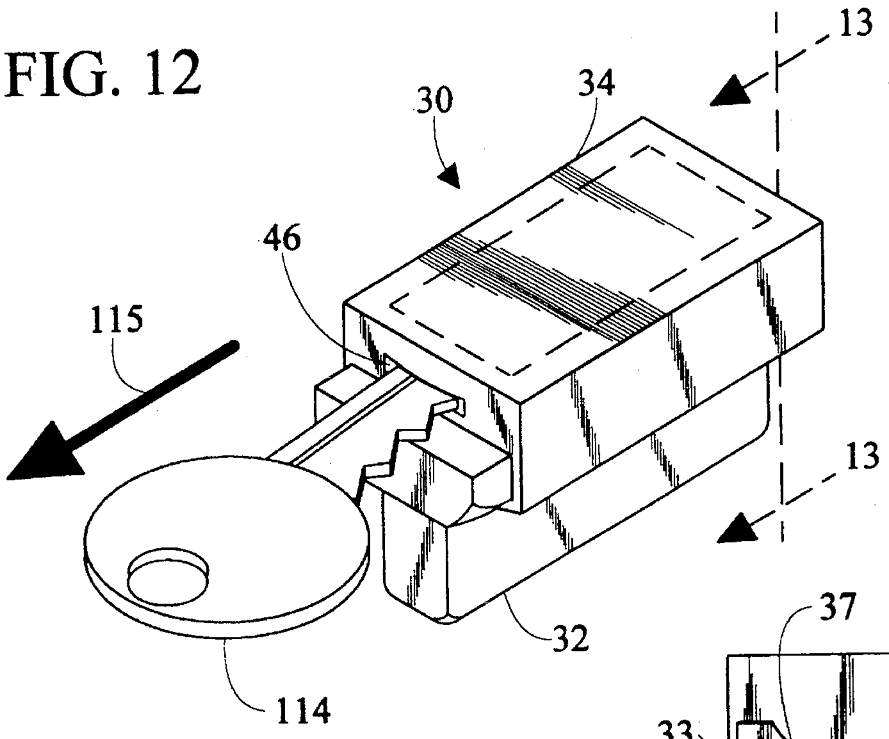
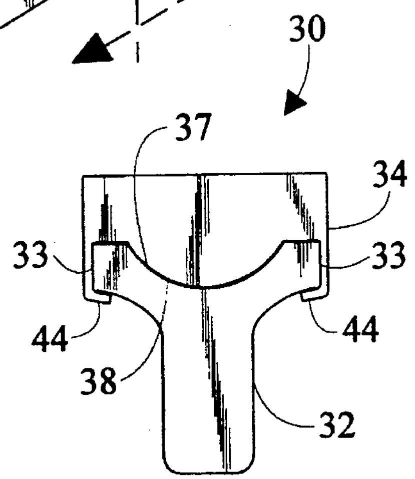
FIG. 13
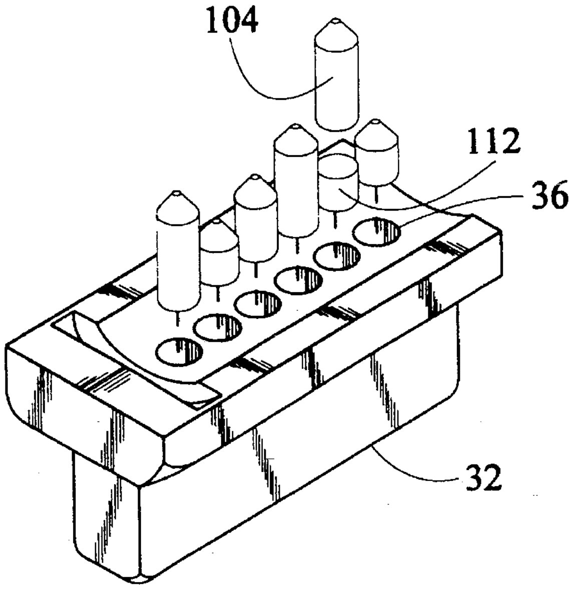
FIG. 14
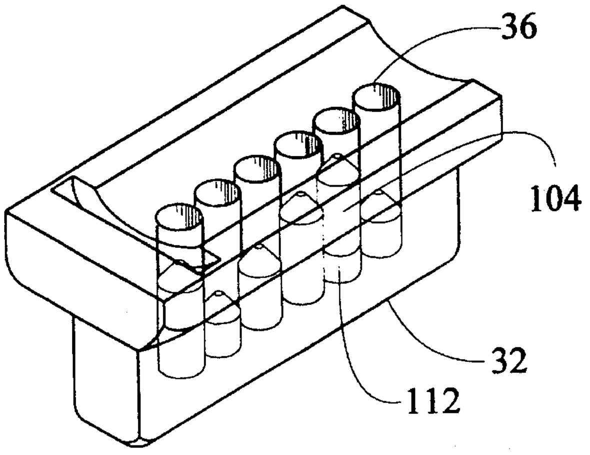
FIG. 15

FIG. 16
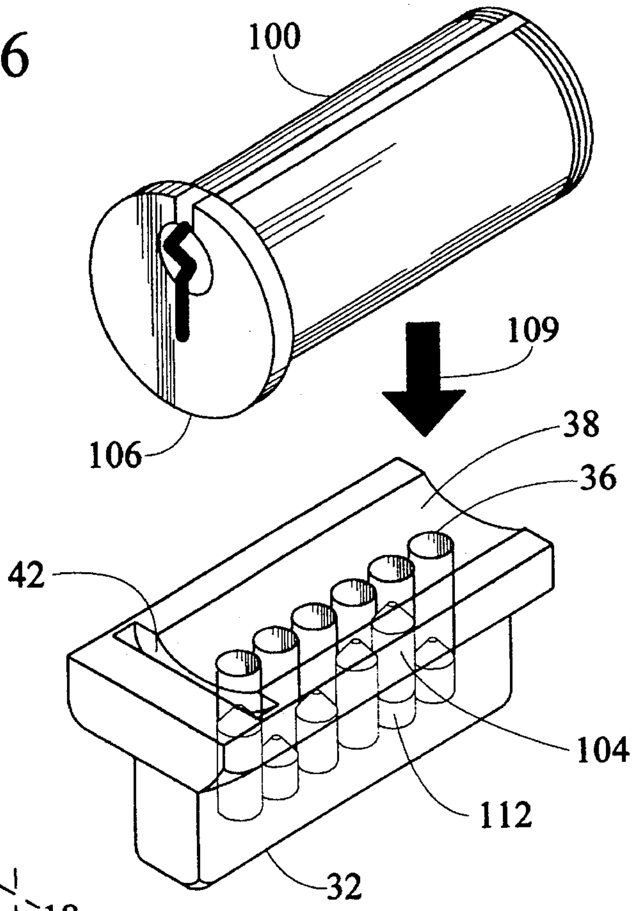
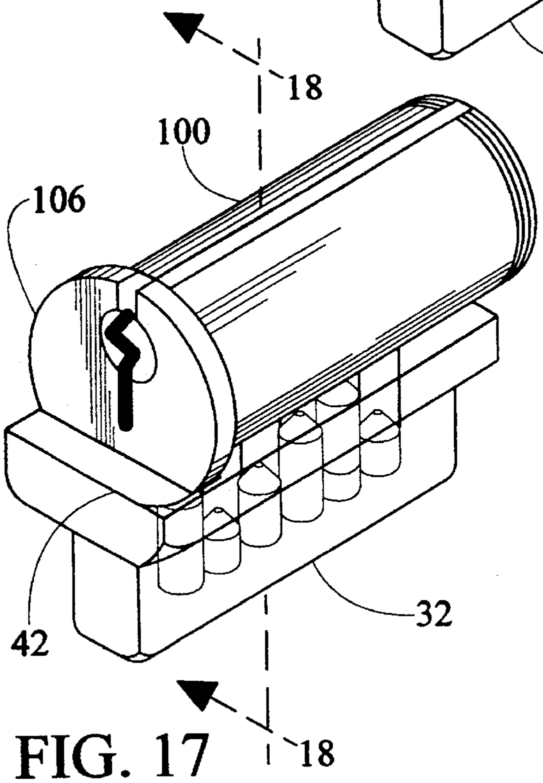
FIG. 17
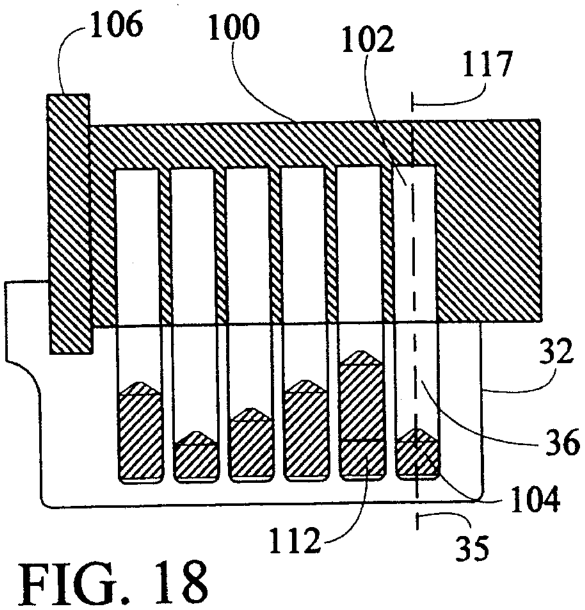
FIG. 18

FIG. 19
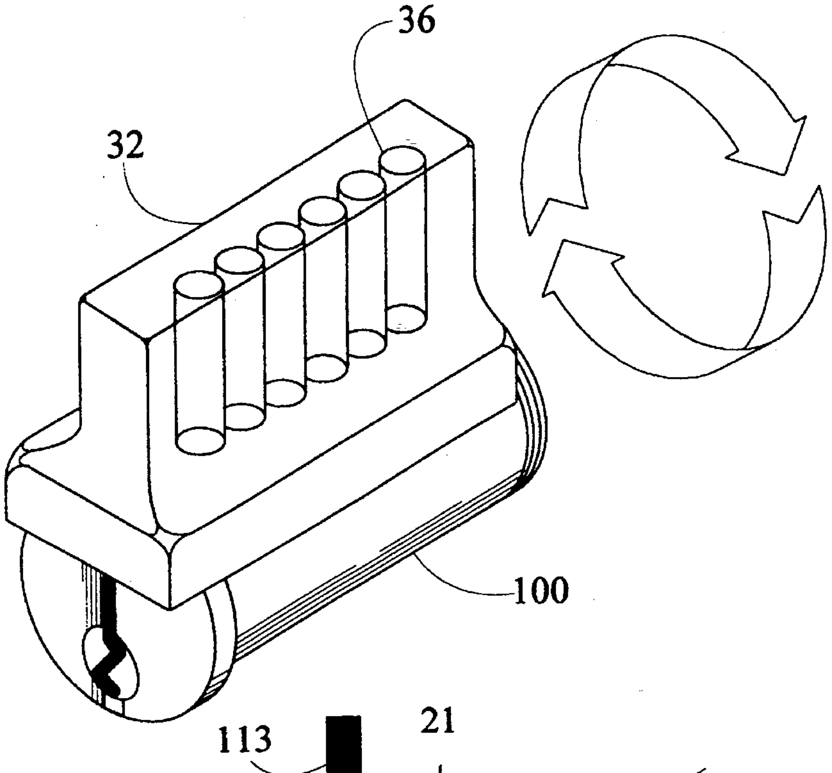
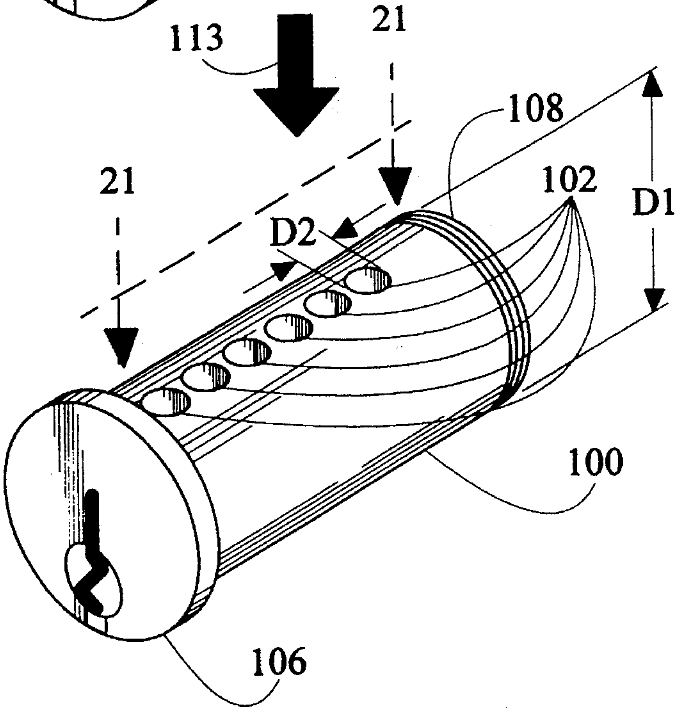
FIG. 20
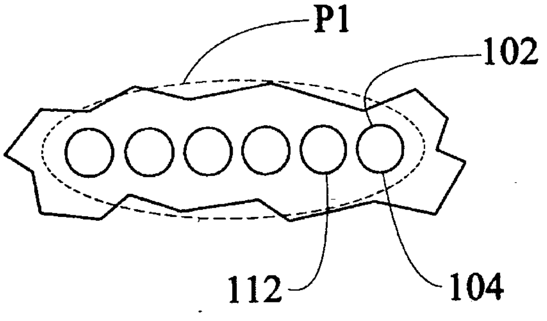
FIG. 21

LOADER AND METHOD FOR LOADING LOCK PINS

TECHNICAL FIELD

The present invention pertains to a loader and method for loading lock pins into the plug portion of a cylindrical lock, and more particularly to a loader and method which enables expeditious and error free lock pin loading.

BACKGROUND ART

The so-called pin tumbler cylinder lock, or Yale lock, was introduced about 1860 and remains in wide use today. The Yale lock consists essentially of a cylindrical plug placed in an outer barrel. The plug is rotated by a key which in turn moves the bolt of the lock by means of a cam. In order to rotate the plug, the key is inserted and raises a plurality of lock pins of varying lengths different distances depending upon the depths of the key cuts to establish a shear line at the outer surface of the plug when the key and pins match. This shear line permits the plug to be rotated within the barrel operating the lock.

A problem which continually besets locksmiths is the loading of the proper lock pins into the cylindrical cavities (typically 5, 6, or 7 in number) in the plug. For a given lock the lock pins come in two basic types, bottom pins and master pins, and each of these come in a variety of lengths to correspond with the lock's key configuration. The exact combination of proper lock pins must be loaded into each of the cavities in the plug in order for the lock to function. This loading operation is usually performed manually through the use of tweezers, and can be both time consuming and error laden. Prior to loading, the lock pins are usually stored in a partitioned tray which separates the pins of various types and lengths. If lock pins are inadvertently stored in the wrong partition then incorrect pin loading can occur. Additionally, the pin loading operation necessarily demands precision, and is therefore sometimes difficult to perform under job site conditions.

DISCLOSURE OF INVENTION

The present invention is directed to a lock pin loader and method of loading lock pins into the plug portion of a cylindrical lock. With appropriate dimensional variations, the loader can be used in cooperation with any plug portion to provide rapid and error free lock pinning. Furthermore, the loader can accommodate all possible lock pin combinations and permutations and is also reusable. The loader can be preloaded with lock pins and, with the accompanying key(s), sold as a lock pinning kit. Alternatively, the loader can be used as a tool by loading the proper combination of lock pins at the shop, and then transporting the loader to a job site for use. This avoids taking the entire pinning kit (partitioned tray, tweezers, pinning documentation, et al) to the job site.

In accordance with a preferred embodiment of the invention, the loader has a body, the body having a plurality of cylindrical pin dispensing barrels arranged in a substantially linear predetermined pattern. The pattern of the pin dispensing barrels is the same as the corresponding substantially linear predetermined pattern of a plurality of cylindrical pin cavities located in the plug portion of the lock.

In accordance with another preferred embodiment of the invention, the loader has a cylindrically shaped flute which has an effective diameter substantially equal to the diameter of the plug portion, so that the loader can fit over and closely cover the plug portion. The flute has a longitudinal centerline, and the plurality of pin dispensing barrels are substantially aligned along that centerline.

In accordance with another preferred embodiment of the invention, the loader further includes a registration means/or coaxially aligning the plurality of pin dispensing barrels with the corresponding plurality of pin cavities in the plug portion.

In accordance with an important aspect of the invention, the loader includes a cover which is removably connected to the body. The cover is concavely contoured to closely fit over the cylindrically shaped flute and contain the plurality of lock pins within the plurality of pin dispensing barrels.

In accordance with an important feature of the invention, the diameter of the plurality of pin dispensing barrels is substantially equal to the diameter of the plurality of pin cavities.

In accordance with another important aspect of the invention, the body is fabricated from a transparent plastic material.

Other features and advantages of the present invention will become apparent from the following detailed description, taken in conjunction with the accompanying drawings, which illustrate, by way of example, the principles of the invention.

BRIEF DESCRIPTION OF DRAWINGS

FIG. 1 is a perspective view of the pin loader in accordance with the present invention;

FIG. 2 is a top view of the body of the pin loader;

FIG. 3 is a side view of the body;

FIG. 4 is an end view of the body;

FIG. 5 is a cross sectional view of the body along the line 5—5 of FIG. 2;

FIG. 6 is a cross sectional view of the body along the line 6—6 of FIG. 3;

FIG. 7 is a cross sectional view of the body along the line 7—7 of FIG, 3;

FIG. 8 is a side view of a transparent body with lock pins installed;

FIG. 9 is a top view of the removable cover;

FIG. 10 is a side view of the cover;

FIG. 11 is an end view of the cover;

FIG. 12 is a perspective view of the pin loader showing the blade of a key being removed from the cover;

FIG. 13 is an end view of the pin loader in the direction 13—13 of FIG, 12;

FIG. 14 is a perspective view of the body showing lock pins being loaded;

FIG. 15 is a perspective view of the body with the lock pins loaded;

FIG. 16 is a perspective view of the plug portion of a cylindrical lock and the body;

FIG. 17 is a perspective view of the body snugly receiving the plug portion;

FIG. 18 is a cross section view of the body and plug portion along the line 18—18 of FIG. 17;

FIG. 19 is a perspective view of the body and the plug portion rotated upside down;

FIG. 20 is a perspective view of the plug portion after the loading process; and, FIG. 21 is a fragmented top view of the plug portion along the line 21—21 of FIG. 20.

MODES FOR CARRYING OUT THE INVENTION

Referring initially to FIG. 1 there is illustrated an exploded perspective view of a pin loader for loading lock pins into the plug portion of a cylindrical lock in accordance with the present invention, generally designated as 30. The pin loader 30 is comprised of a body 32 and a removably connected cover 34. The pin loader 30 is designed to cooperate with the plug portion 100 of a cylindrical lock (FIG. 20). The plug portion 100 is cylindrically shaped having a first diameter. D1. The plug portion 100 has a plurality of cylindrical pin cavities 102 each having a second diameter D2 sized to receive lock pins 104 and 112 (FIG. 8). In the shown embodiment, the plug portion 100 has six pin cavities 102. A typical plug portion 100 will have 5, 6, or 7 pin cavities 102, however any number of pin cavities 102 can be accommodated by the present invention. The pin cavities 102 are arranged in a first substantially linear predetermined pattern P1 (FIG. 21). The plug portion 100 further has a circular flange 106.

FIG. 2 is a top view of body 32 of the pin loader 30. Body 32 has a plurality of cylindrical pin dispensing barrels 36 that correspond to the pin cavities 102 of the plug portion 100 (FIG. 20). Pin dispensing barrels 36 are arranged in a second substantially linear predetermined pattern P2 which is the same and exactly matches the first substantially linear predetermined pattern P1 of the plug portion 100. Pin dispensing barrels 36 each have a fourth diameter D4 which is substantially equal to the second diameter D2 of the pin cavities 102 of the plug portion 100. In some instances it will be desirable for fourth diameter D4 to be slightly larger than second diameter D2 in order to accommodate manufacturing tolerances in body 32, the plug portion 100, and the lock pins 104 and 112 (FIG. 8). Body 32 has a cylindrically shaped flute 38 which is aligned along a longitudinal centerline 40. Pin dispensing barrels 36 are substantially aligned along centerline 40. Body 32 can be fabricated from a variety of materials including plastic, metal, wood, etc.

FIG. 3 is a side view of body 32.

FIG. 4 is an end view of body 32. Flute 38 has a third effective diameter D3 which is substantially equal to the first diameter D1 of the plug portion 100 (FIG. 20). Body 32 has a pair of integral longitudinal shoulders 33.

FIG. 5 is a cross sectional view of body 32 along the line 5—5 of FIG. 2 showing the plurality of pin dispensing barrels 36. The body 32 further includes a registration means integral with body 32 for coaxially aligning the plurality of pin dispensing barrels 36 with the corresponding plurality of pin cavities 102 (FIG. 20. In the embodiment shown, the registration means includes a traverse recess 42 which is sized to snugly receive flange 106 of plug portion 100 (FIG. 20), The flange 106 fits into recess 42 and thereby coaxially aligns pin dispensing barrels 36 with pin cavities 102. However, other registration means could also be employed such as providing body 32 with a mechanical stop which would abut either the flange 106 or the threaded end 108 of the plug portion 100 (FIG. 20), and would similarly register the body 32 with the plug portion 100.

FIG. 6 is a cross sectional view of body 32 along the line 6—6 of FIG. 3. In this view one pin dispensing barrel 36 is shown.

FIG. 7 is a cross sectional view of body 32 along line 7—7 of FIG. 3. Traverse recess 42 is contoured to snugly receive the circular flange 106 of the plug portion 100 (FIG. 20).

FIG. 8 is a side view of a transparent embodiment of body 32 with lock pins 104 and 112 loaded. In this embodiment, body 32 is fabricated from a transparent plastic such as styrene or acrylic. Using a transparent material permits the user to observe the lock pins 104 and 112 that reside within body 32. This feature is useful in that it allows the user to visually verify the proper location of lock pins 104 and 112, and particularly so when lock pins 104 and 112 are of various colors. It is noted that lock pins 104 are of varying length and have conical crowns. These lock pins 104 are known as bottom pins and are the pins which are typically engaged by the lock's key. Another type of lock pin is a master lock pin 112. Master lock pins 112 typically have straight ends and are used in conjunction with a master key. The master lock pins 112 can be loaded in one or more of the pin cavities 102 of the plug portion 100 (FIG. 20). The lock pin 104, master lock pin 112, and plug portion 100 configuration shown herein is representative of a typical cylindrical lock. A multitude of other combinations and permutations of bottom lock pins 104, master lock pins 112, and plug portion 100 arrangements can also be used in conjunction with the present invention.

FIGS. 9, 10, and 11 are top, side, and end views respectively of removably connected cover 34. Cover 34 has a concavely contoured portion 37 which closely fits over flute 38 of body 32 (FIG. 4). Cover 34 has an integral pair of runners 44, which longitudinally engage shoulders 33 of body 32 so that cover 34 may slide onto body 32 and thereby closely cover flute 38 and contain lock pins 104 and 112 (FIG. 8) therewithin. Cover 34 further includes a slot 46 which is sized to snugly receive the blade of a key for storage purposes. Cover 34 can be fabricated from a variety of materials. A resilient plastic has been found to be useful. Indicia 48 can be disposed on cover 34 to provide useful pin and key related information. For example, BOTTOM and MASTER pinning information, BITTING information, and a key identifier could be included.

FIG. 12 is a perspective view of the pin loader 30. Cover 34 has been longitudinally slid onto and covers body 32. With cover 34 in place, lock pins 104 and 112 are retained within pin dispensing cavities 36 (FIG.8). In the figure, key 114 is shown being withdrawn from slot 46 in direction 115.

FIG. 13 is an end view of the pin loader 30 in the direction 13—13 of FIG. 12. The concavely contoured portion 37 of cover 34 closely fits over cylindrically shaped flute 38 in body 32. Cover 34 is held in place by runners 44 which longitudinally engage shoulders 33 of body 32.

FIG. 14 is a perspective view of a transparent body 32 showing lock pins 104 and 112 being loaded into pin dispensing barrels 36. The lock pins 104 and 112 can be manually loaded by using tweezers or the like, or an automatic loading device could be used. It is noted that as in FIG. 8, one of the pin dispensing barrels 36 is additionally loaded with a master lock pin 112.

FIG. 15 is a perspective view of a transparent body 32 with the lock pins 104 and 112 loaded in pin dispensing barrels 36.

FIG. 16 is a perspective view of the plug portion 100 of a cylindrical lock and a transparent body 32. The plug portion 100 has a plurality of pin cavities 102 (FIG. 20) sized to receive lock pins 104 and 112. Body 32 has a corresponding plurality of pin dispensing barrels 36 also sized to receive lock pins 104 and 112. The plug portion 100 is shown ready to be placed on top of body 32, the plug portion 100 moving in direction 109.

FIGS. 16 through 21 in conjunction with FIG. 1 provide a pictorial view of the pin loading process. Referring initially to FIG. 16, the pin loader 30 (FIG. 1) is used to load lock pins 104 and 112 into the plug portion 100 as follows: Body 32 containing lock pins 104 and 112 is oriented so that pin dispensing barrels 36 are substantially vertical and open upwardly. Cover 34 (FIG. 1) is then removed from body 320. The plug portion 100 is oriented so that the pin cavities 102 (FIG. 20) are substantially vertical and open downwardly. Now also referring to FIG. 17, the plug portion 100 is placed on top of body 32 so that pin cavities 102 (FIG. 20) abut and coaxially align with the corresponding pin dispensing barrels 36 (FIG. 16). In the embodiment shown, circular flange 106 is received by traverse recess 42 which serves to register the plug portion 100 to body 32. FIG. 18 is a cross sectional view of FIG. 17 showing transparent body 32 containing lock pins 104 and 112, and plug portion 100. Body 32 is registered to plug portion 100 so that longitudinal axes 35 of pin dispensing barrels 36 are coaxial with longitudinal axes 117 of corresponding pin cavities 102. Now also referring to FIG. 19, the plug portion 100 and body 32 are manually held together while the combination is turned upside down (rotated vertically approximately 180°). After the rotation, gravity causes lock pins 104 and 112 to vacate pin dispensing barrels 36 and enter corresponding pin cavities 102 (FIG. 18). Body 32 and plug portion 100 are then separated in direction 113 as shown in FIG. 20.

FIG. 21 is a fragmented top view of the plug portion 100 along the line 21—21 of FIG. 20, and shows the lock pins 104 and 112 loaded in the pin cavities 102 of the plug portion 100.

The method of use described above pertains to a pin loader 30 that has been previously loaded with lock pins 104 and 112 and is available at a job site. This method can be expanded to include the initial loading of lock pins 104 and 112 into the pin loader 30, and transportation of the pin loader 30 to the job site as follows: orienting body 32 so that pin dispensing barrels 36 are substantially vertical and open upwardly; loading the desired combination of lock pins 104 and 112 into the pin dispensing barrels 36; installing cover 34 onto body 32; transporting the pin loader 30 to the job site; and continuing with the steps previously outlined.

The preferred embodiments of the invention described herein are exemplary and numerous modifications, dimensional variations, and rearrangements can be readily envisioned to achieve an equivalent result, all of which are intended to be embraced within the scope of the appended claims.

I claim:

1. A pin loader for loading lock pins into the plug portion of a cylindrical lock, the plug portion being of cylindrical shape having a first diameter, the plug portion having a plurality of cylindrical pin cavities of a second diameter sized to receive the lock pins, the pin cavities arranged in a first substantially linear predetermined pattern, the plug portion having a circular flange, said pin loader comprising:

a body having a corresponding plurality of cylindrical pin dispensing barrels arranged in a second substantially linear predetermined pattern, said second pattern adapted to conform to the first pattern of the plug portion;

said body further having a cylindrically shaped flute having a third effective diameter and a longitudinal centerline, said third diameter adapted to conform to the first diameter of the plug portion; and, a cover removeably connected to said body and concavely contoured to closely fit over said cylindrically shaped flute, said body further having shoulders, and said cover having an integral pair of runners which longitudinally engage said shoulders of said body so that said cover may slide onto said body and thereby closely cover said flute and contain the lock pins therewithin.

2. A pin loader according to claim 1, said cover further including a slot adapted to snugly receive the blade of a key.

3. A pin loader according to claim 1, said cover further having indicia disposed thereon.

4. A method for loading lock pins into the plug portion of a cylindrical lock, the plug portion having a plurality of pin cavities sized to receive the lock pins, the method comprising the steps of:

providing a pin loader having a body with a corresponding plurality of pin dispensing barrels, a plurality of lock pins loaded within said barrels, and a removable cover covering said pin dispensing barrels;

orienting said body so that said barrels are substantially vertical and open upwardly;

removing said cover;

orienting the plug portion so that the pin cavities are substantially vertical and open downwardly;

placing the plug portion on top of said body so that the pin cavities abut and coaxially align with said corresponding pin dispensing barrels;

holding the plug portion and said body together and turning the combination upside down; and, removing said body.

5. A method for loading lock pins into the plug portion of a cylindrical lock, the plug portion having a plurality of pin cavities sized to receive the lock pins, the method comprising the steps of:

providing a pin loader having a body with a corresponding plurality of pin dispensing barrels, a plurality of lock pins, a removable cover for covering said pin dispensing barrels, and a job site;

orienting said body so that said barrels are substantially vertical and open upwardly;

loading said lock pins into said pin dispensing barrels;

installing said cover;

transporting said pin loader to a job site;

removing said cover;

orienting said body so that said barrels are substantially vertical and open upwardly;

orienting the plug portion so that the pin cavities are substantially vertical and open downwardly;

placing the plug portion on top of said body so that the pin cavities abut and coaxially align with said corresponding pin dispensing barrels;

holding the plug portion and said body together and turning the combination upside down; and, removing said body.

* * * * *